United States Patent [19]

Staiert

[11] 4,230,130
[45] Oct. 28, 1980

[54] COMBINE GRAIN LOSS SENSING

[75] Inventor: Richard W. Staiert, Geneseo, Ill.

[73] Assignee: International Harvester Company, Chicago, Ill.

[21] Appl. No.: 8,996

[22] Filed: Feb. 5, 1979

[51] Int. Cl.³ .............................................. A01F 12/00
[52] U.S. Cl. .................................. 130/27 R; 56/10.2; 130/27 T
[58] Field of Search ........................ 56/10.2, DIG. 15; 130/27 R, 27 T, 24

[56] References Cited
U.S. PATENT DOCUMENTS

| 3,606,745 | 9/1971 | Girodat | 56/DIG. 15 |
| 3,610,252 | 10/1971 | DeCoene et al. | 56/DIG. 15 |

Primary Examiner—Jay N. Eskovitz
Attorney, Agent, or Firm—Neal C. Johnson; F. David AuBuchon

[57] ABSTRACT

A self-propelled axial flow combine having a crop harvesting header for supplying crop material to a longitudinally oriented rotor power-rotated within a generally cylindrical casing. The casing includes a grate through which crop material is impelled at high speed by the rotor. The combine includes a grain cleaning system having a chaffer sieve reciprocably mounted to receive crop material from the grate for sifting the material as a part of the cleaning process. Crop sensors are mounted on the chaffer sieve to sense material flow from the grate. In addition, crop sensors are mounted at the rear of the chaffer sieve for sensing crop losses from the sieve.

8 Claims, 3 Drawing Figures

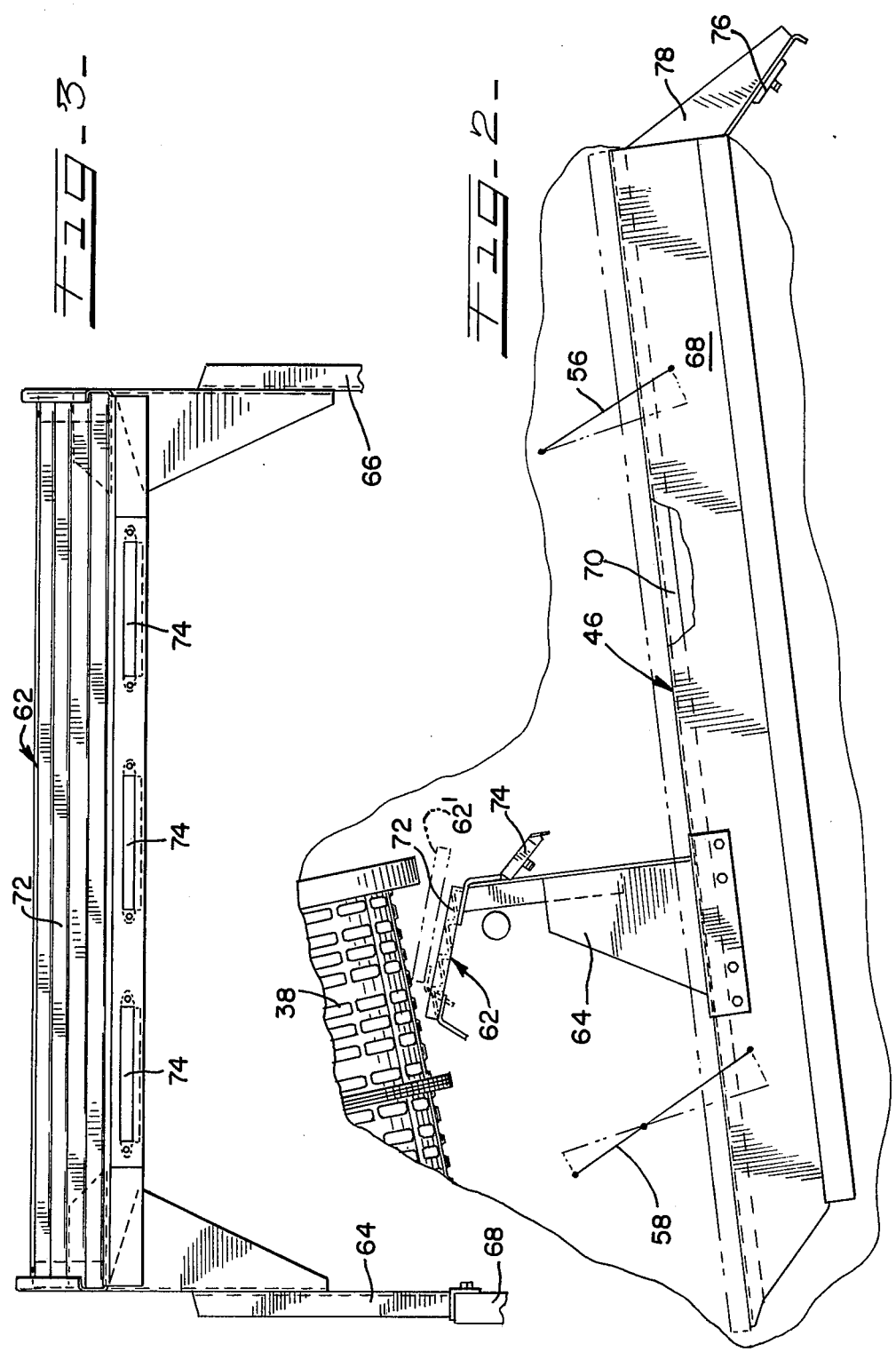

COMBINE GRAIN LOSS SENSING

BACKGROUND OF THE INVENTION

1. Field of the Invention

The invention relates generally to axial flow combines and more particularly to sensing crop losses from the threshing region and also from the grain cleaning region of the combine.

2. Prior Art

Several patents are known to Applicant which show grain loss or flow rate monitors disposed within combines: U.S. Pat. Nos. 3,935,866, 3,638,695, 3,610,252, 3,606,745, 3,515,144, 3,563,013 and East German Pat. No. 53,446. Some of these patents relate to controlling ground speed in response to grain losses while others simply indicate losses or flow rates at selected points.

None of these patents shows or relates to axial flow type combines. An axial flow combine includes a cylindrical rotor driven at high speeds to effect the threshing and separating functions in conjunction with associated concaves and grates. The high speed of the axial flow rotor causes the crop material to be discharged through the grates at high velocity and with high kinetic energy. And therein lies the basis of a problem when it is desired to monitor material flow rates or grain losses.

State-of-the-art sensors for monitoring flow rates or material losses include transducers (U.S. Pat. No. 3,935,866 for example) disposed in the path of material flow and upon which the material impacts and from which readings are translated to the machine operator through known electronic circuitry. When used in an axial flow combine to monitor flow rates from the rotor, such a transducer is subject to the high kinetic energy of the material resulting in high rates of wear and rapid deterioration of the transducer.

The kinetic energy ($E = \frac{1}{2}mv^2$) of the material is proportional to the second power of the velocity and only to the first power of the mass such that particles differing only slightly in mass but traveling at the same velocity assume nearly indentical impact characteristics on a transducer. This is particularly the case under low mass, high velocity conditions. Thus, a grain loss system that discriminates grain particles from stems, joints, and other crop material will be ineffective under the high kinetic energy conditions associated with axial flow rotors.

Another problem area is in the proper placement of the sensors to consistently sample the discharged material as to content of the flow and the ratio of sampled flow to total flow. Further, the sensors should not impede the material flow so as to cause bridging or blocking of the material. And since the combine includes several different but interrelated systems (such as a grain separating system and a grain cleaning system), the problem exists of how to position the sensors to provide an indication of the efficiency of the various systems per se and relative to each other.

SUMMARY

The invention provides a grain loss monitoring system for an axial flow type combine wherein sensors are located to effectively monitor grain losses from the grain threshing and separating system and also from the grain cleaning system.

Means are included to prevent high wear rates and rapid deterioration of state-of-the-art sensors monitoring material flow from the axial flow rotor. This is accomplished by interposing means between the rotor and the sensors for absorbing the kinetic energy of the discharged material. In a preferred embodiment of the invention the energy absorbing means is mounted on the reciprocating chaffer sieve of the cleaning system. This is not merely a convenience but effectively utilizes the reciprocating or oscillating motion of the sieve to assist movement of the material toward the sensor and thus minimize or eliminate bridging or blocking of the crop material.

The chaffer sieve can further be utilized in monitoring grain losses from the combine cleaning system. That is, sensors may be mounting on the discharge end of the sieve to monitor cleaning efficiency.

It is a principal object of the invention to provide an effective grain loss monitoring system for an axial flow combine.

More particularly, it is an object to provide such a system which reduces or solves problems associated with high kinetic energy of crop material discharged by the rotor of an axial flow combine. More specifically, the invention reduces high wear rates and rapid deterioration of presently available state-of-the-art transducers.

It is a further object to utilize existing structure of the grain cleaning system as a means for locating and mounting grain loss sensors, not only for the cleaning system, but for the threshing and separating system as well.

A still further object of the invention is to provide a grain loss sensor arrangement utilizing the reciprocating or oscillating motion of a grain cleaning sieve to assist movement of crop material to the sensors and to minimize buildup or blockage of the material.

Another object is to utilize the present state-of-the-art sensors so as to preclude a need for special sensors to withstand high velocity particles and requiring special electronic circuits for discriminating between grain and other material particles.

BRIEF DESCRIPTION OF THE DRAWINGS

FIG. 2 is an enlarged fragmentary side elevation of the grain loss monitoring system of FIG. 1; and FIG. 3 is an enlarged end view of a portion of the grain loss monitoring system of FIGS. 1 and 2.

PREFERRED EMBODIMENT OF THE INVENTION

Figure 1:
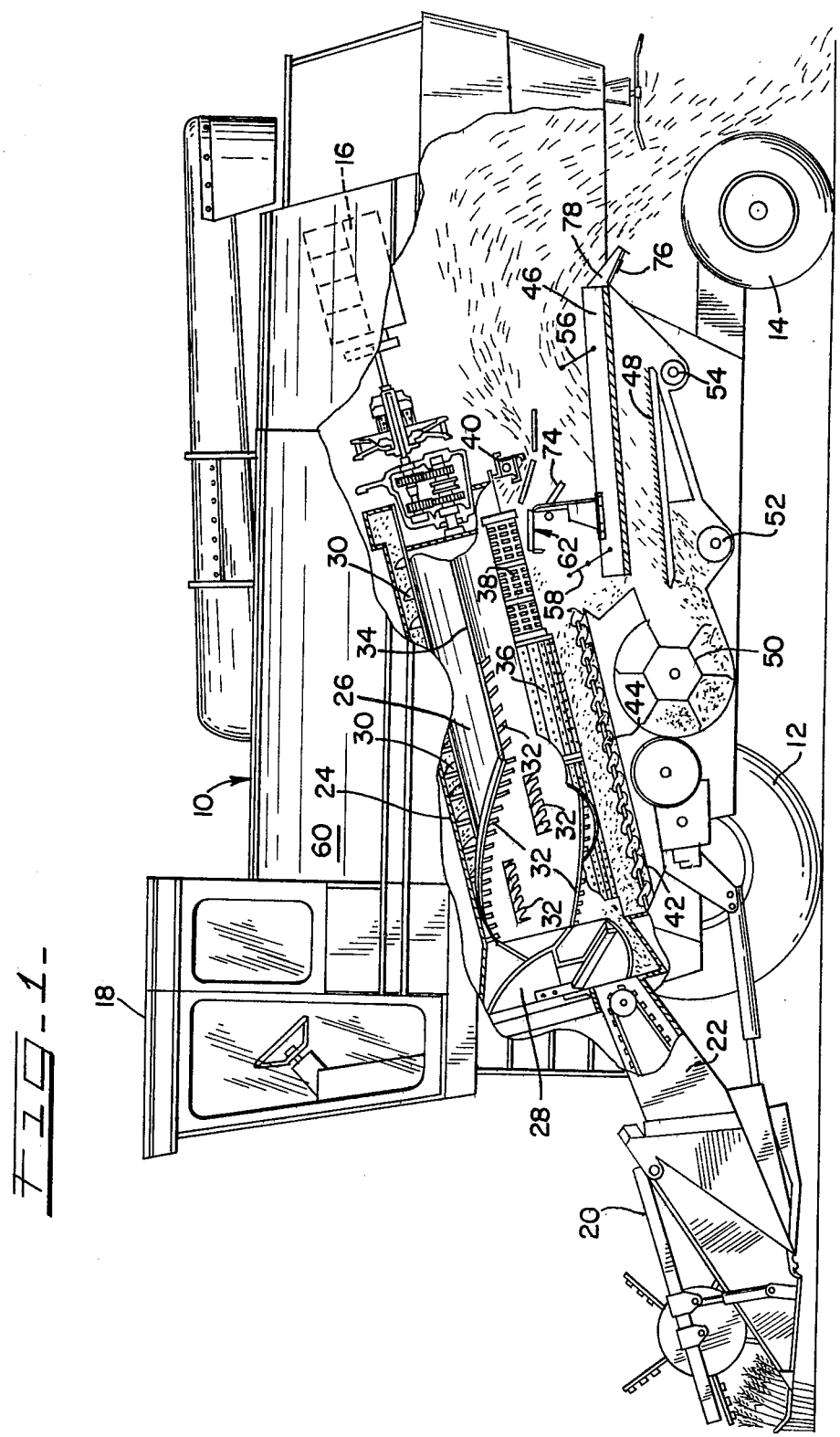
FIG. 1 is a side elevation view partly in section of an axial flow combine utilizing the grain loss sensing system of the invention.

Referring first to FIG. 1 there is shown an axial flow combine of the general type marketed by the assignee herein under model designations 1440, 1460, and 1480. The combine includes a body 10 supported on front drive wheels 12 and steerable rear wheels 14. The combine is powered by an engine 16 and controlled from an operator's control center 18. A crop harvesting header 20 cuts the crop and conveys it to a feeder 22 which feeds the crop material into an axial threshing and separating unit including a generally cylindrical casing 24 and a generally cylindrical rotor 26 mounted therein. The rotor 26 is driven from the engine 16 and includes a front mounted impeller 28 which imparts rearward movement to the crop material received from the feeder 22. High speed rotation of the rotor 26 together with spiral vanes 30 on the upper inner surface of the casing 24 impell the material rearwardly in a generally spiral direction about the rotor.

A plurality of rasp bars 32 and transport bars 34 mounted on the rotor 26 cooperate respectively with a semi cylindrical concave 36 and a semi-cylindrical grate 38 to thresh the crop material such that most of the grain will be separated and impelled downwardly through the concave and grate. The straw and other waste material is impelled rearwardly out of the casing 24 where a rotary beater 40 throws the straw rearwardly from the machine as shown. Most of the grain drops onto a grain pan 42 where it is conveyed rearwardly by a plurality of augers 44 for subsequent cleaning and collection.

The combine includes a system for cleaning chaff and foreign matter, or tailings etc. from the grain. This system includes a chaffer sieve 46, a grain sieve 48, a cleaning fan 50, a clean grain auger 52, and a tailings auger 54. The chaffer sieve 46 is supported for fore-and-aft reciprocation or oscillation by a pair of arms 56 and 58 so that grain and tailings received from the augers 44 and grate 38 will be passed to the grain sieve 48. The sieve 48 is mounted by arms (not shown) for reciprocation to separate the grain from the tailings so that the grain passes through the sieve and onto the clean grain auger 52 while the tailings are moved rearwardly onto the tailings auger 54. The cleaning fan 50 creates an air flow upwardly and rearwardly through both sieves to carry away the chaff. The clean grain collected by the auger 52 is delivered through an elevator (not shown) to a grain tank 60 while the tailings collected by the auger 54 are conveyed by suitable elevator means (not shown) to the casing 24 for rethreshing.

In accordance with the invention an elongated catch pan 62 is supported on the chaffer sieve 46 by a pair of vertical supports 64 and 66 (FIGS. 2 and 3) bolted on respective side rails 68 and 70 of the chaffer sieve 46. The pan 62 extends the full width of the sieve 46 and is preferably disposed relative to the grate 38 so as to reciprocate beneath the rearmost four to six inches of the grate (note the solid and dotted line positions of FIG. 2). The pan 62 includes a downwardly and rearwardly inclined corrugated surface 72 for purposes to be described.

As best shown in FIGS. 2 and 3 a plurality of electrical transducers 74 is mounted on the pan structure 62 intermittently along the length of the pan. Each transducer 74 may consist of a piezoelectric ceramic plate electrically connected with appropriate readout displays (not shown) located in the control center 18. The transducers 74 are responsive to impingement of crop material thereagainst to ultimately provide an indication of the flow rate therepast, all as is well known in the art.

The invention may further include a plurality of transducers 76 identical to the transducers 74 mounted on a bracket 78 secured to the rearward end of the chaffer sieve 46. The transducers 76 are preferably spaced across the width of the sieve in the same manner as the transducers 74 in FIG. 3.

In operation, crop material is thrown outwardly through the grate 38 by the threshing and separating action of the rotor 26. The pan structure 62 is disposed to receive the direct impact of the material. The corrugated surface 72 assists movement of material rearwardly toward the sensors 74 as the entire structure oscillates with the sieve 46. The material then flows across the sensors and appropriate readings of flow rate are provided to the operator. In practice the pan 62 oscillates fore-and-aft four to six inches of the rearmost extent of the grate 38. Lab tests have shown this to be a valid sample "window" having a high correlation to the lost grain content of the material discharged from the beater 40. Thus, it is unnecessary to obtain flow rate readouts for the entire material flow. It will be seen that the sensors 74 receives material having been deenergized by impact onto the pan 62. The oscillating motion of the pan and sensors tend to preclude buildup of crop material. In overall effect the above arrangement provides an indication of the crop threshing efficiency of the machine.

An indication of the crop cleaning efficiency is provided by the sensors 76 at the rear end of the chaffer sieve 46. These sensors function in the same manner as the sensors 74 to provide an indication to the operator of material flow rate thereacross.

By the foregoing invention, means are provided to effectively monitor grain losses in an axial flow combine.

What is claimed is:

1. In an axial flow combine, the combination comprising:
   a generally cylindrical rotor casing having an open end for reception of crop material and further having a grate through which crop material may exit from the casing;
   a rotor journalled for rotation within said casing for threshing crop material introduced into said casing and impelling portions thereof out of said casing through said grate;
   a crop cleaning system including a chaffer sieve reciprocably mounted beneath said grate for sifting crop material therethrough; and
   a crop sensor mounted on said chaffer sieve for reciprocation therewith and disposed proximate to said grate for sensing flow of crop material therefrom.

2. The subject matter of claim 1, including means interposed between said grate and said sensor for absorbing kinetic energy of the material impelled through said grate before it passes across said sensor, whereby said sensor is not subjected to high impact loads and rapid wear.

3. The subject matter of claim 2, wherein said means is mounted on said chaffer sieve for reciprocation therewith to assist movement of crop material toward said sensor.

4. In an axial flow combine, the combination comprising:
   a generally cylindrical rotor casing having an open end for reception of crop material and further having a grate through which crop material may exit from the casing;
   a rotor journalled for rotation within said casing for threshing crop material introduced into said casing and impelling portions thereof out of said casing through said grate;
   a crop cleaning system including a reciprocably mounted chaffer sieve having a forward end adjacent to said grate and extending rearwardly therefrom for sifting crop material;
   first crop sensor means mounted on said chaffer sieve for determining crop losses from said grate whereby crop threshing efficiency may be monitored; and
   second crop sensor means disposed proximate to the rearward end of said chaffer sieve for determining crop losses from said sieve whereby crop cleaning efficiency may be monitored.

5. The subject matter of claim 4, including means interposed between said grate and said first sensor means for absorbing kinetic energy of the material impelled through said grate before it passes across said first sensor means, whereby said first sensor means is not subjected to high impact loads and rapid wear.

6. The subject matter of claim 4, wherein said second crop sensor means is connected to said chaffer sieve for reciprocation therewith.

7. The subject matter of claim 5, wherein said second crop sensor means is connected to said chaffer sieve for reciprocation therewith.

8. In an axial flow combine, the combination comprising:
- a generally horizontally disposed generally cylindrical casing having an open end for reception of crop material to be threshed and separated and a discharge end including a grate at the bottom rear of the casing;
- a rotor journalled for rotation within said casing for threshing and separating crop material introduced into said casing and impelling portions of the crop material downwardly out of said casing through said grate;
- a crop cleaning system including a chaffer sieve reciprocably mounted at a level beneath said grate for sifting crop material therethrough;
- an elongated pan rigidly mounted on said chaffer sieve and extending transversely of said casing beneath said grate for receiving the kinetic impact of crop material thrown thereagainst by said rotor through said grate;
- a plurality of material flow sensors connected to said pan for sensing the passage of crop material from said pan, said sensors being disposed out of the range of direct impact of the crop material emanating from said grate whereby said sensors are not subjected to high impact loading and rapid wear; and
- said pan including a corrugated surface which is oriented to enhance the flow of material to said sensors as said pan is reciprocated with said chaffer sieve.

* * * * *